United States Patent
Park et al.

(10) Patent No.: US 11,537,395 B2
(45) Date of Patent: Dec. 27, 2022

(54) METHOD FOR OPTIMIZING PERFORMANCE OF ALGORITHM USING PRECISION SCALING

(71) Applicant: IUCF-HYU (INDUSTRY-UNIVERSITY COOPERATION FOUNDATION HANYANG UNIVERSITY), Seoul (KR)

(72) Inventors: Yongjun Park, Seoul (KR); Seokwon Kang, Seoul (KR); Sang Wook Kim, Seoul (KR); Hong Kyun Bae, Seoul (KR); Jae Seo Yu, Seoul (KR); Kyunghwan Choi, Seoul (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 0 days.

(21) Appl. No.: 17/519,079

(22) Filed: Nov. 4, 2021

(65) Prior Publication Data

US 2022/0236987 A1    Jul. 28, 2022

(30) Foreign Application Priority Data

Sep. 4, 2020 (KR) .................. 10-2020-0113285

(51) Int. Cl.
*G06F 9/30* (2018.01)
*G06F 11/34* (2006.01)
(Continued)

(52) U.S. Cl.
CPC ...... *G06F 9/30014* (2013.01); *G06F 11/3423* (2013.01); *G06F 11/3428* (2013.01); *G06T 7/20* (2013.01); *H04N 19/513* (2014.11)

(58) Field of Classification Search
CPC ............ G06F 9/30014; G06F 11/3423; G06F 11/3428; G06F 9/44578; G06F 9/44505;
(Continued)

(56) References Cited

U.S. PATENT DOCUMENTS

2019/0089976 A1*   3/2019   Huang ................ H04N 19/517
2020/0151573 A1*   5/2020   Das ...................... G06N 3/0481

FOREIGN PATENT DOCUMENTS

KR    10-2008-0096306 A     10/2008
KR       10-2037043 B1       10/2019

OTHER PUBLICATIONS

Carson et al.; Accelerating the solution of linear systems by iterative refinement in three precisions; SIAM; 2018 (Year: 2018).*
(Continued)

*Primary Examiner* — Corey S Faherty
(74) *Attorney, Agent, or Firm* — Sughrue Mion, PLLC (57) ABSTRACT

This application relates to a method for optimizing algorithm performance using precision scaling, wherein the method according to an embodiment of present invention comprises obtaining a number of iterations of a unit operation according to precisions of the algorithm including the unit operation that is repeatedly performed, wherein the precisions include a first precision and a second precision, and the number of iterations include a first number of iterations corresponding to the first precision and a second number of iterations corresponding to the second precision; inspecting available precisions of a device on which the algorithm is to be executed, wherein the available precisions include a first available precision corresponding to the first precision and a second available precision corresponding to the second precision; determining an optimal precision by repeatedly performing the unit operation corresponding to an initial operation of the algorithm using the inspected available precision; and repeatedly performing the unit operation corresponding to a remaining operation of the algorithm with the optimal precision.

10 Claims, 5 Drawing Sheets

(51) Int. Cl.
*H04N 19/513* (2014.01)
*G06T 7/20* (2017.01)

(58) Field of Classification Search
CPC .... G06F 11/3628; G06F 11/3636; G06T 7/20; H04N 19/513
See application file for complete search history.

(56) References Cited

OTHER PUBLICATIONS

Tian et al.; ApproxMA: Approximate Memory Access for Dynamic Precision Scaling; ACM; 2015 (Year: 2015).*
Yesil et al.; Toward Dynamic Precision Scaling; IEEE; 2018 (Year: 2018).*
Wess et al.; Weighted Quantization-Regularization in DNNs for Weight Memory Minimization Toward HW Implementation; IEEE; 2018 (Year: 2018).*
Communication dated Mar. 22, 2022 from the Korean Patent Office in Korean Application No. 10-2020-0113285.
Seokwon Kang et al., "AutoScale: an automatic instruction-level precision scaling framework", Korean Institute of Information Scientists and Engineers, 2018, pp. 1-3 (4 pages total).
Woongki Baek et al., "Green: A Framework for Supporting Energy-Conscious Programming using Controlled Approximation", 2010 (12 pages total).

* cited by examiner

METHOD FOR OPTIMIZING PERFORMANCE OF ALGORITHM USING PRECISION SCALING

CROSS-REFERENCE TO RELATED APPLICATION

The present application claims priority to Korean Patent Application No. 10-2020-0113285, filed Sep. 4, 2020, the entire contents of which are incorporated herein for all purposes by this reference.

BACKGROUND OF THE INVENTION

1. Field of the Invention

The present invention relates to a method of optimizing the performance of an algorithm using precision scaling, and more particularly, to a method of selecting a precision suitable for a system that executes an algorithm and executing the algorithm by dynamically applying precision scaling.

2. Description of the Related Art

Precision scaling is one of the widely used approximation methods and there are various hardware/software methods for precision scaling. As a generally used software method, there is a method of finding an optimal precision by executing an application with various precisions and comparing accuracy and performance for each precision. Furthermore, a method of achieving high performance improvement with minimal loss of accuracy by using multiple precisions for operations at the same time is also being used. In this case, variables or pieces of data in source code become targets for precision scaling. Since the number of possible precision combinations increases as the number of targets increases, an optimal precision of the entire application is rapidly found in a variety of ways, such as scaling a precision by grouping multiple targets, prioritizing the targets and applying priorities sequentially, and the like.

Generally, some algorithms, such as a recommendation algorithm and the like, repeatedly perform the same unit operation until an error of a result of an operation becomes a certain level or lower. However, when a precision of an operation is lowered by applying precision scaling to an algorithm, the accuracy of a result of each unit operation is lowered, and thus the number of iterations of operations until an error converges a certain level or lower may be increased. That is, when the precision scaling is applied, a total operation time may be rather increased. Further, since a low precision does not always result in high performance in all devices, a total operation time may be increased even when the number of iterations of operations is not increased.

In order to solve the above problem, precision scaling as in the related art requires a long execution time because the entire execution of an algorithm should be repeated several times for each precision. Further, the number of unit operations performed increases or the performance of each operation varies due to the precision scaling according to a given input depending on a system in which the algorithm is executed, and thus when the system or the input is changed, the same result cannot be guaranteed even when applying the conventional precision scaling.

SUMMARY OF THE INVENTION

The present invention is directed to providing a technique for reducing an execution time by optimizing an algorithm including a unit operation that is repeatedly performed.

Objects of the present invention are not limited to the above-described object and other objects that are not described may be clearly understood by those skilled in the art from this specification and the accompanying drawings.

According to an embodiment of present invention, a method for optimizing performance of an algorithm using precision scaling, comprising: obtaining a number of iterations of a unit operation according to precisions of the algorithm including the unit operation that is repeatedly performed, wherein the precisions include a first precision and a second precision, and the number of iterations include a first number of iterations corresponding to the first precision and a second number of iterations corresponding to the second precision; inspecting available precisions of a device on which the algorithm is to be executed, wherein the available precisions include a first available precision corresponding to the first precision and a second available precision corresponding to the second precision; determining an optimal precision by repeatedly performing the unit operation corresponding to an initial operation of the algorithm using the inspected available precision; and repeatedly performing the unit operation corresponding to a remaining operation of the algorithm with the optimal precision may be provided.

Solutions of the present invention are not limited to the above-described solution and other solutions that are not described may be clearly understood by those skilled in the art from this specification and the accompanying drawings.

According to the embodiment of the present specification, in an initial execution of an algorithm, it is possible to check execution performance according to each precision of an operation and perform the operation in a minimum time in consideration of the number of operations performed according to a precision.

According to the embodiment of the present specification, an operation of an algorithm can be performed according to each precision, a total execution time can be predicted in consideration of the number of iterations of the operation, which is required for each precision, a recommendation algorithm can be executed in a minimum time, and thus the algorithm can be accelerated according to a device, in which the algorithm is executed, without loss of accuracy.

According to the embodiment of the present specification, it is possible to rapidly obtain an optimal precision of an algorithm in various systems, and thus the algorithm can be accelerated with respect to a plurality of different types of devices.

Effects of the present invention are not limited to the above-described effects and other effects that are not described may be clearly understood by those skilled in the art from this specification and the accompanying drawings.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Since embodiments described in the present specification are intended to clearly explain the spirit of the present invention to those skilled in the art to which the present invention pertains, the present invention is not limited by the embodiments described herein and the scope of the present invention should be construed as including modifications, variations, equivalents, or substitutes that do not depart from the spirit of the present invention. In describing the present invention, a detailed description of related well-known configurations or functions may be omitted.

Although terms used herein are selected from among general terms that are currently and widely used in consideration of functions in the embodiments of the present invention, these may be changed according to intentions of those skilled in the art, precedents, or the advent of new technology. However, in a specific case, some terms may be arbitrary selected by the applicants. In this case, meanings thereof will be described in detail in a corresponding description of the embodiments of the present invention. Therefore, the terms used herein should be defined based on meanings of the terms and content of this entire specification, rather than simply the terms themselves.

The accompanying drawings of the present specification are for easy explanation of the present invention and the shapes illustrated in the drawings may be exaggerated and displayed as necessary to aid understanding of the present invention, and thus the present invention is not limited by the drawings. In addition, the terms "first," "second," etc. used in the description of the present specification are merely identification symbols for distinguishing one component from another component.

According to an embodiment of present invention, a method for optimizing performance of an algorithm using precision scaling, comprising: obtaining a number of iterations of a unit operation according to precisions of the algorithm including the unit operation that is repeatedly performed, wherein the precisions include a first precision and a second precision, and the number of iterations include a first number of iterations corresponding to the first precision and a second number of iterations corresponding to the second precision; inspecting available precisions of a device on which the algorithm is to be executed, wherein the available precisions include a first available precision corresponding to the first precision and a second available precision corresponding to the second precision; determining an optimal precision by repeatedly performing the unit operation corresponding to an initial operation of the algorithm using the inspected available precision; and repeatedly performing the unit operation corresponding to a remaining operation of the algorithm with the optimal precision may be provided.

Here, the determining the optimal precision comprises selecting the optimal precision between the first available precision and the second available precision.

Here, each of the first precision and the second precision is one of a double precision, a single precision and a half precision.

Here, the method further comprising inserting a scaling function for scaling data according to the available precisions into an application.

Here, the determining the optimal precision comprises: obtaining a first unit execution time corresponding to the first available precision by performing the unit operation using data scaled to the first available precision; scaling data of the first available precision to the second available precision; obtaining a second unit execution time corresponding to the second available precision by performing the unit operation using data scaled to the second available precision; calculating a first expected execution time corresponding to the first available precision based on the first number of iterations and the first unit execution time; calculating a second expected execution time corresponding to the second available precision based on the second number of iterations and the second unit execution time; and determining the optimal precision by comparing the first expected execution time and the second expected execution time.

Here, the obtaining the first unit execution time and the obtaining the second unit execution time are characterized in that the unit operation is performed once.

Here, the calculating the first expected execution time comprises calculating the first expected execution time by multiplying the first number of iterations and the first unit execution time, and wherein the calculating the second expected execution time comprises calculating the second expected execution time by multiplying the second number of iterations and the second unit execution time.

Here, the precisions further include a third precision, and wherein the number of iterations further include a third number of iterations corresponding to the third precision.

Here, the available precisions further include a third available precision corresponding to the third precision, wherein the determining the optimal precision further comprises: scaling data of the second available precision to the third available precision; obtaining a third unit execution time corresponding to the third available precision by performing the unit operation using data scaled to the third available precision; and calculating a third expected execution time corresponding to the third available precision based on the third number of iterations and the third unit execution time, and wherein the determining the optimal precision determines the optimal precision by comparing the first expected execution time, the second expected execution time and the third expected execution time.

Here, the determining the optimal precision comprises selecting the optimal precision among the first available precision, the second available precision and the third available precision.

In the present specification, the algorithm may be an algorithm including a unit operation that is repeatedly performed. Alternatively, the algorithm may be an algorithm that repeatedly performs the same unit operation until an error of a result of a corresponding operation becomes a certain level or lower. Examples of the algorithm include a recommendation algorithm of a singular value decomposition method using gradient descent, but the present invention is not limited thereto, and any algorithm including a unit operation that is repeatedly performed may be applied to the optimization method according to the embodiment of the present specification.

In the present specification, a double precision, a single precision, and a half precision are mainly described as examples of the precision, but the precision is not limited thereto.

Figure 1:
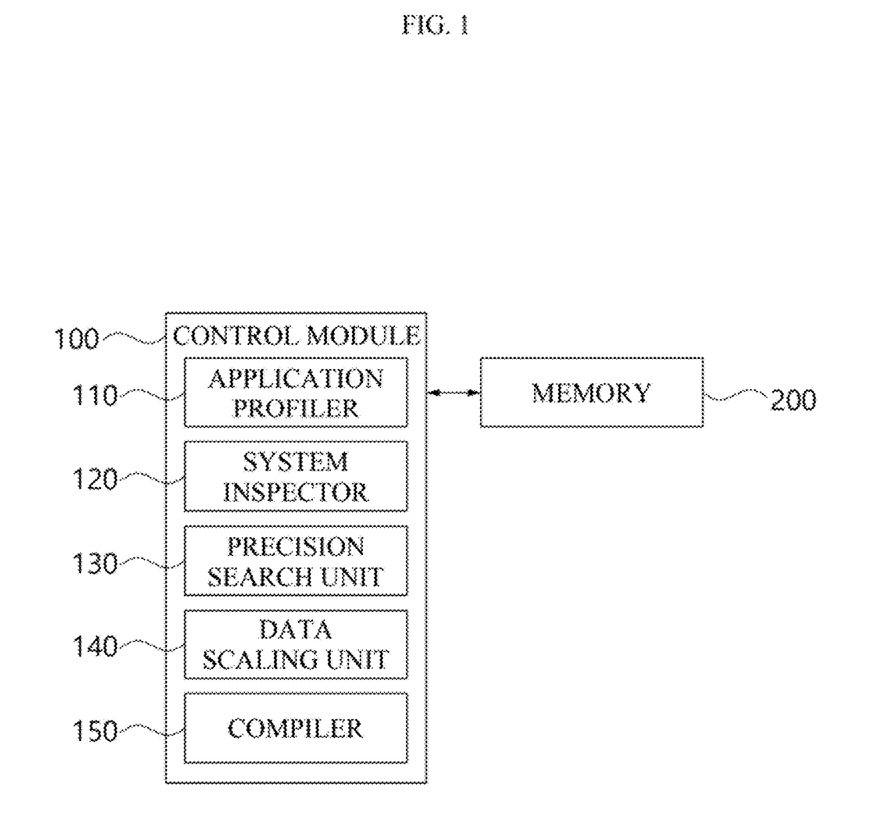
FIG. 1 is a diagram of an optimization system according to an embodiment of the present specification.
Figure 2:
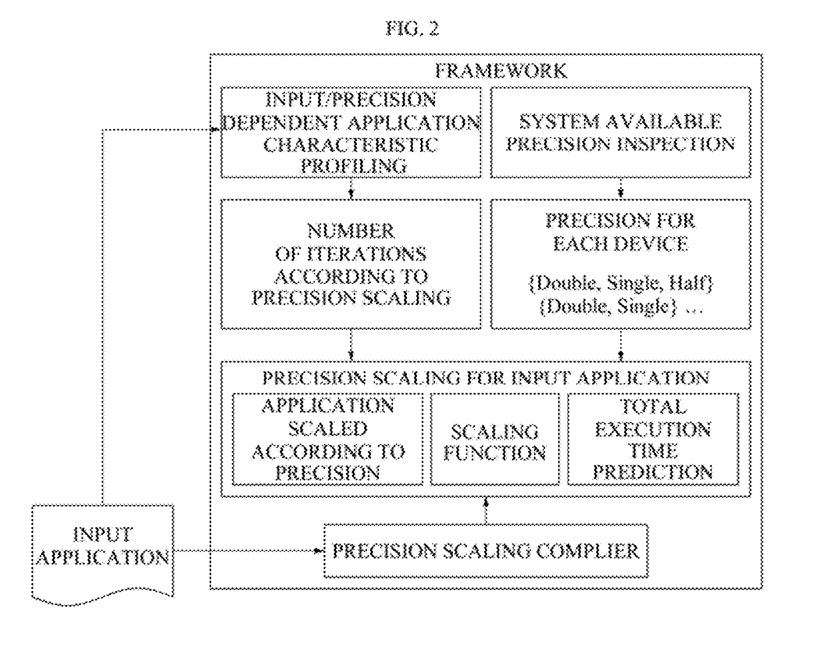
FIG. 2 is a diagram of a framework according to an embodiment of the present specification.

The method of optimizing the performance of the algorithm using the precision scaling according to the embodiment of the present specification may be performed by an optimization system. FIG. 1 is a diagram of an optimization system according to an embodiment of the present specification, and FIG. 2 is a diagram of a framework according to an embodiment of the present specification.

Referring to FIG. 1, the optimization system may include a control module 100 and a memory 200.

The control module 100 may process and operate an algorithm. The control module 100 may be implemented in software, hardware, and a combination thereof For example, the control module 100 may be implemented as a central processing unit (CPU), a graphics processing unit (GPU), a digital signal processor (DSP), a field programmable gate array (FPGA), an application specific integrated circuit (ASIC), a semiconductor chip, or one of other various types of electronic circuits in hardware. Alternatively, for example, in software, the control module 100 may be implemented in a logic program executed according to the above-described hardware or in one of various computer languages.

The memory 200 may be configured to store various types of data. For example, the memory 200 may be configured to store an algorithm to be processed by the control module 100. Further, the memory 200 may include a flash memory type, a hard disk type, a random access memory (RAM), a read only memory (ROM), a magnetic memory, a magnetic disk, an optical disc, and the like.

Referring to FIGS. 1 and 2, the control module 100 may include an application profiler 110, a system inspector 120, a precision search unit 130, a data scaling unit 140, and a compiler 150.

According to an embodiment, the application profiler 110 may profile the number of iterations of a unit operation within an application according to precision. For example, when an operation is performed according to a first precision, the number of iterations of the unit operation within the application may be a first number of iterations, and when the operation is performed according to a second precision, the number of iterations of the unit operation may be a second number of iterations. Here, the number of iterations of the unit operation for each precision may be independent of a device.

According to an embodiment, the system inspector 120 may check a usable precision (hereinafter, referred to as an "available precision") of a device in which the application is operated. The available precision may be different for each device. For example, referring to FIG. 2, some devices may use a double precision, a single precision, and a half precision, whereas other devices may only use a double precision and a single precision.

According to an embodiment, the precision search unit 130 may determine an optimal precision of the device. For example, the precision search unit 130 may determine an optimal precision among available precisions of the device.

According to an embodiment, the data scaling unit 140 may scale data according to a specific precision. For example, the data scaling unit 140 may scale data having a first precision according to a second precision.

According to an embodiment, the compiler 150 may implement the precision scaling of the application. According to an embodiment, the compiler may insert a scaling function for scaling data into the application.

The components of the control module described above are merely examples and a control module in which some of the above-described components are excluded or other components are added may be provided. Further, each component of the control module does not refer to only a separate physical component.

Figure 3:
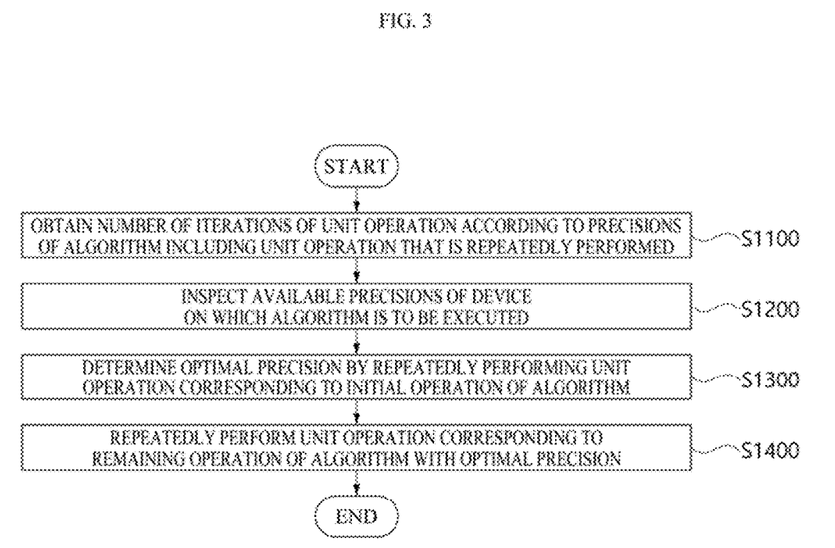
FIG. 3 is a flowchart of a method of optimizing the performance of an algorithm using precision scaling according to an embodiment of the present specification.

FIG. 3 is a flowchart of a method of optimizing performance of an algorithm using precision scaling according to an embodiment of the present specification. Referring to FIG. 3, the optimization method may include an operation S1100 of obtaining the number of iterations of a unit operation according to precisions of the algorithm including the unit operation that is repeatedly performed, an operation S1200 of inspecting available precisions of a device on which the algorithm is to be executed, an operation S1300 of determining an optimal precision by repeatedly performing the unit operation corresponding to an initial operation of the algorithm, and an operation S1400 of repeatedly performing the unit operation corresponding to a remaining operation of the algorithm according to the optimal precision.

According to an embodiment, the operation S1100 of obtaining the number of iterations of the unit operation according to the precisions of the algorithm including the unit operation that is repeatedly performed may include obtaining the number of iterations of operations corresponding to a plurality of precisions. For example, the control module may obtain at least two of a first number of iterations, which is the number of iterations of operations corresponding to a double precision, a second number of iterations, which is the number of iterations of operations corresponding to a single precision, and a third number of iterations, which is the number of iterations of operations corresponding to a half precision.

According to an embodiment, the operation S1200 of inspecting the available precisions of the device on which the algorithm is to be executed may include inspecting a plurality of available precisions. For example, the control module may obtain at least two of a first available precision corresponding to the double precision, a second available precision corresponding to the single precision, and a third available precision corresponding to the half precision.

Figure 4:
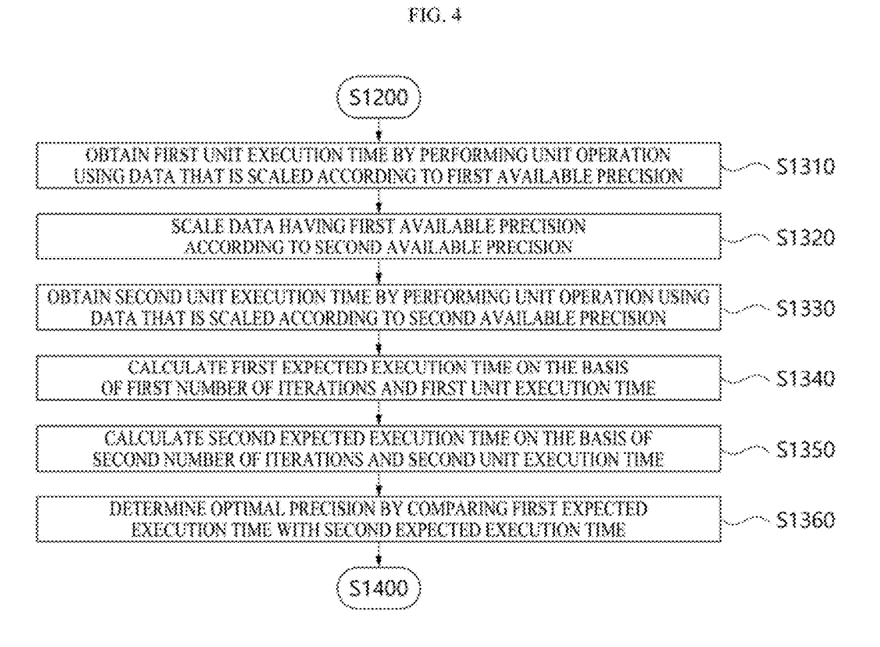
FIG. 4 is a flowchart of an operation of determining an optimal precision by repeatedly performing a unit operation corresponding to an initial operation of an algorithm according to an embodiment of the present specification.

FIG. 4 is a flowchart of the operation S1300 of determining the optimal precision by repeatedly performing the unit operation corresponding to the initial operation of the algorithm according to the embodiment of the present specification. Referring to FIG. 4, the operation S1300 of determining the optimal precision by repeatedly performing the unit operation corresponding to the initial operation of the algorithm may include an operation S1310 of obtaining a first unit execution time by performing the unit operation using data that is scaled according to the first available precision, an operation S1320 of scaling the data having the first available precision according to the second available precision, an operation S1330 of obtaining a second unit execution time by performing the unit operation using the data that is scaled according to the second available precision, an operation S1340 of calculating a first expected execution time on the basis of the first number of iterations and the first unit execution time, an operation S1350 of calculating a second expected execution time on the basis of the second number of iterations and the second unit execution time, and an operation S1360 of determining the optimal precision by comparing the first expected execution time with the second expected execution time.

According to an embodiment, the operation S1310 of obtaining the first unit execution time by performing the unit operation using the data that is scaled according to the first available precision and the operation S1330 of obtaining the second unit execution time by performing the unit operation using the data that is scaled according to the second available precision may include obtaining the first unit execution time corresponding to the first available precision by performing the unit operation one or more times and obtaining the second unit execution time corresponding to the second available precision by performing the unit operation one or more times, respectively. For example, the control module may obtain the first unit execution time by performing the unit operation one time using the data that is scaled according to the double precision and may obtain the second unit execution time by performing the unit operation one time using the data that is scaled according to the single precision. Here, as the number of times the unit operation is performed decreases, it may be more advantageous for optimization, but the unit operation is not necessarily performed one time.

According to an embodiment, the operation S1340 of calculating the first expected execution time on the basis of the first number of iterations and the first unit execution time and the operation S1350 of calculating the second expected execution time on the basis of the second number of iterations and the second unit execution time may include calculating the first expected execution time by multiplying the first number of iterations and the first unit execution time and calculating the second expected execution time by multiplying the second number of iterations and the second unit execution time, respectively. For example, the control module may calculate the first expected execution time by multiplying the number of operations of the double precision and the unit execution time and calculate the second expected execution time by multiplying the number of operations of the single precision and the unit execution time.

According to an embodiment, the operation S1360 of determining the optimal precision by comparing the first expected execution time with the second expected execution time may include selecting a specific precision from among the plurality of available precisions. Here, the selected precision may be a precision with a minimum expected execution time. For example, the control module may compare the expected execution time of the double precision with the expected execution time of the single precision to determine a precision with a smaller expected execution time as the optimal precision.

The method of optimizing the performance of the algorithm using the precision scaling according to the embodiment of the present specification may further include a compiling operation. According to an embodiment, the compiling operation may include inserting a scaling function for scaling data according to available precisions into an application. According to an embodiment, in the compiling operation, a compiler may insert a function for implementing each operation for each precision and scaling data according to a specific precision into the application.

The available precisions of the device have been described as being two available precisions such as the first available precision and the second available precision, but there may be three or more available precisions. Even in this case, the above-described optimization method may be applied. For example, the control module may obtain a third number of iterations corresponding to the third available precision, obtain a third unit execution time by performing the unit operation using the data that is scaled according to the third available precision, calculate a third expected execution time on the basis of the third number of iterations and the third unit execution time, and determine the optimal precision by comparing the first expected execution time, the second expected execution time, and the third expected execution time with each other.

Figure 5:
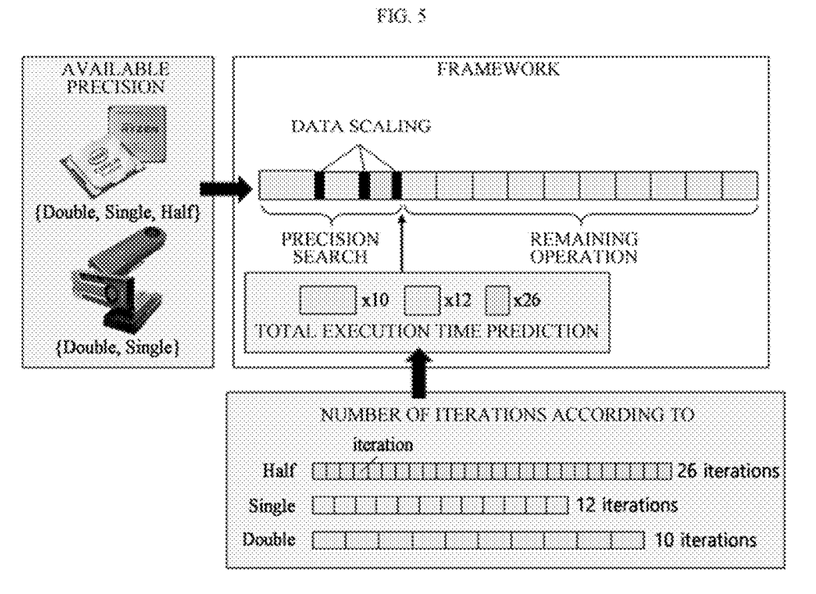
FIG. 5 is a diagram of an execution scenario of an optimization method according to an embodiment of the present specification.

FIG. 5 is a diagram of an execution scenario of the optimization method according to the embodiment of the present specification. Referring to FIG. 5, the control module may inspect the available precisions of the device on which the algorithm is to be executed before the execution of the algorithm and profile the number of iterations of the unit operation according to the precision. Thereafter, the control module may check the performance of the algorithm for each precision by performing the unit operation one time for each available precision of the device (precision search). Here, the control module may scale data used in operations in order to successively perform the operations according to different precisions (data scaling). Further, the control module may predict a total execution time on the basis of the number of iterations of the unit operation, which is pre-obtained, according to the precisions. The control module may determine the precision with the shortest predicted total execution time as the optimal precision. Thereafter, the control module may repeatedly perform a remaining unit operation according to the determined optimal precision (remaining execution).

The method according to the embodiment of the present specification may be implemented in the form of program instructions that can be executed through various computer units and recorded on computer readable media. The computer readable media may include program instructions, data files, data structures, or combinations thereof. The program instructions recorded on the computer readable media may be specially designed and prepared for the embodiments of the invention or may be available well-known instructions for those skilled in the field of computer software. Examples of the computer readable media include magnetic media such as a hard disk, a floppy disk, and a magnetic tape, optical media such as a compact disc read only memory (CD-ROM) and a digital video disc (DVD), magneto-optical media such as a floptical disk, and a hardware device, such as a ROM, a RAM, or a flash memory, that is specially made to store and perform the program instructions. Examples of the program instruction include machine code generated by a compiler and high-level language code that can be executed in a computer using an interpreter and the like. The hardware device may be configured as at least one software module in order to perform operations of embodiments of the present invention and vice versa.

In the above, the configuration and features of the present invention have been described based on the embodiments, but the present invention is not limited thereto, and it should be clear to those skilled in the art that various changes and modifications thereto are possible without departing from the spirit and scope of the present invention. Therefore, it is intended that the changes and modifications fall within the scope of the appended claims.

What is claimed is:

1. A method for optimizing performance of an algorithm using precision scaling, comprising:
obtaining a number of iterations of a unit operation according to precisions of the algorithm including the unit operation that is repeatedly performed, wherein the precisions include a first precision and a second precision, and the number of iterations include a first number of iterations corresponding to the first precision and a second number of iterations corresponding to the second precision;
inspecting available precisions of a device on which the algorithm is to be executed, wherein the available precisions include a first available precision corresponding to the first precision and a second available precision corresponding to the second precision;

determining an optimal precision by repeatedly performing the unit operation corresponding to an initial operation of the algorithm using the inspected available precision; and repeatedly performing the unit operation corresponding to a remaining operation of the algorithm with the optimal precision.

2. The method of claim 1, wherein the determining the optimal precision comprises selecting the optimal precision between the first available precision and the second available precision.

3. The method of claim 1, wherein each of the first precision and the second precision is one of a double precision, a single precision and a half precision.

4. The method of claim 1, further comprising inserting a scaling function for scaling data according to the available precisions into an application.

5. The method of claim 1, wherein the determining the optimal precision comprises:

obtaining a first unit execution time corresponding to the first available precision by performing the unit operation using data scaled to the first available precision;

scaling data of the first available precision to the second available precision;

obtaining a second unit execution time corresponding to the second available precision by performing the unit operation using data scaled to the second available precision;

calculating a first expected execution time corresponding to the first available precision based on the first number of iterations and the first unit execution time;

calculating a second expected execution time corresponding to the second available precision based on the second number of iterations and the second unit execution time; and determining the optimal precision by comparing the first expected execution time and the second expected execution time.

6. The method of claim 5, wherein the obtaining the first unit execution time and the obtaining the second unit execution time are characterized in that the unit operation is performed once.

7. The method of claim 5, wherein the calculating the first expected execution time comprises calculating the first expected execution time by multiplying the first number of iterations and the first unit execution time, and wherein the calculating the second expected execution time comprises calculating the second expected execution time by multiplying the second number of iterations and the second unit execution time.

8. The method of claim 5, wherein the precisions further include a third precision, and wherein the number of iterations further include a third number of iterations corresponding to the third precision.

9. The method of claim 8, wherein the available precisions further include a third available precision corresponding to the third precision, wherein the determining the optimal precision further comprises:

scaling data of the second available precision to the third available precision;

obtaining a third unit execution time corresponding to the third available precision by performing the unit operation using data scaled to the third available precision; and calculating a third expected execution time corresponding to the third available precision based on the third number of iterations and the third unit execution time, and wherein the determining the optimal precision determines the optimal precision by comparing the first expected execution time, the second expected execution time and the third expected execution time.

10. The method of claim 9, wherein the determining the optimal precision comprises selecting the optimal precision among the first available precision, the second available precision and the third available precision.

* * * * *